United States Patent [19]
Crow

[11] Patent Number: 4,717,086
[45] Date of Patent: Jan. 5, 1988

[54] SPOOL REWINDER

[76] Inventor: John Q. Crow, 1609 W. 8th St., Texarkana, Tex. 75501

[21] Appl. No.: 40,817

[22] Filed: Apr. 21, 1987

Related U.S. Application Data

[63] Continuation-in-part of Ser. No. 901,379, Aug. 28, 1986.

[51] Int. Cl.[4] .................. B65H 54/00; B65H 54/74
[52] U.S. Cl. .................................. 242/47; 242/96; 242/99
[58] Field of Search ............ 242/47, 50, 53, 60, 242/61, 62, 85, 96, 99, 100, 106, 129.51, 1, 18 R

[56] References Cited

U.S. PATENT DOCUMENTS

| | | | |
|---|---|---|---|
| 112,656 | 3/1871 | Vincent | 242/61 |
| 469,524 | 2/1892 | Marley | 242/61 |
| 781,982 | 2/1905 | Aal | 242/61 X |
| 899,423 | 9/1908 | Morrow et al. | 242/61 |
| 1,015,459 | 1/1912 | Riggle | 242/100 |
| 1,323,652 | 12/1919 | Smith | 242/61 |
| 1,702,971 | 2/1929 | Jeffress | 242/61 |
| 1,728,800 | 9/1929 | Makinen | 242/100 |
| 2,132,698 | 10/1938 | Price | 242/47 |
| 2,414,169 | 1/1947 | Raymond | 242/96 |
| 2,734,694 | 2/1956 | Davidson | 242/106 |
| 3,295,787 | 1/1967 | Golonka | 242/129.8 |
| 3,652,027 | 3/1972 | Wong | 242/96 |
| 3,979,833 | 9/1976 | Grudman | 33/138 |
| 4,106,719 | 8/1978 | Haverland | 242/96 |
| 4,164,332 | 8/1979 | Insch | 242/54 R |
| 4,310,126 | 1/1982 | Norleen | 242/47 |

Primary Examiner—Stanley N. Gilreath
Attorney, Agent, or Firm—Kenneth H. Johnson

[57] ABSTRACT

A device for rewinding line onto a spool comprising in one embodiment two substantially parallel sides spaced apart by a handle, a shaft rotatably mounted through a first side and biased toward a second side, with spool gripping means on end of the shaft adjacent to the second side for gripping a spool and forcing it against the second side which is preferably a plate or baffle having a configuration at least as large as the spool. In a second embodiment a single plate is used with a means for biasing a spool against the plate which operates on the rotatable shaft on which the spool is mounted.

19 Claims, 17 Drawing Figures

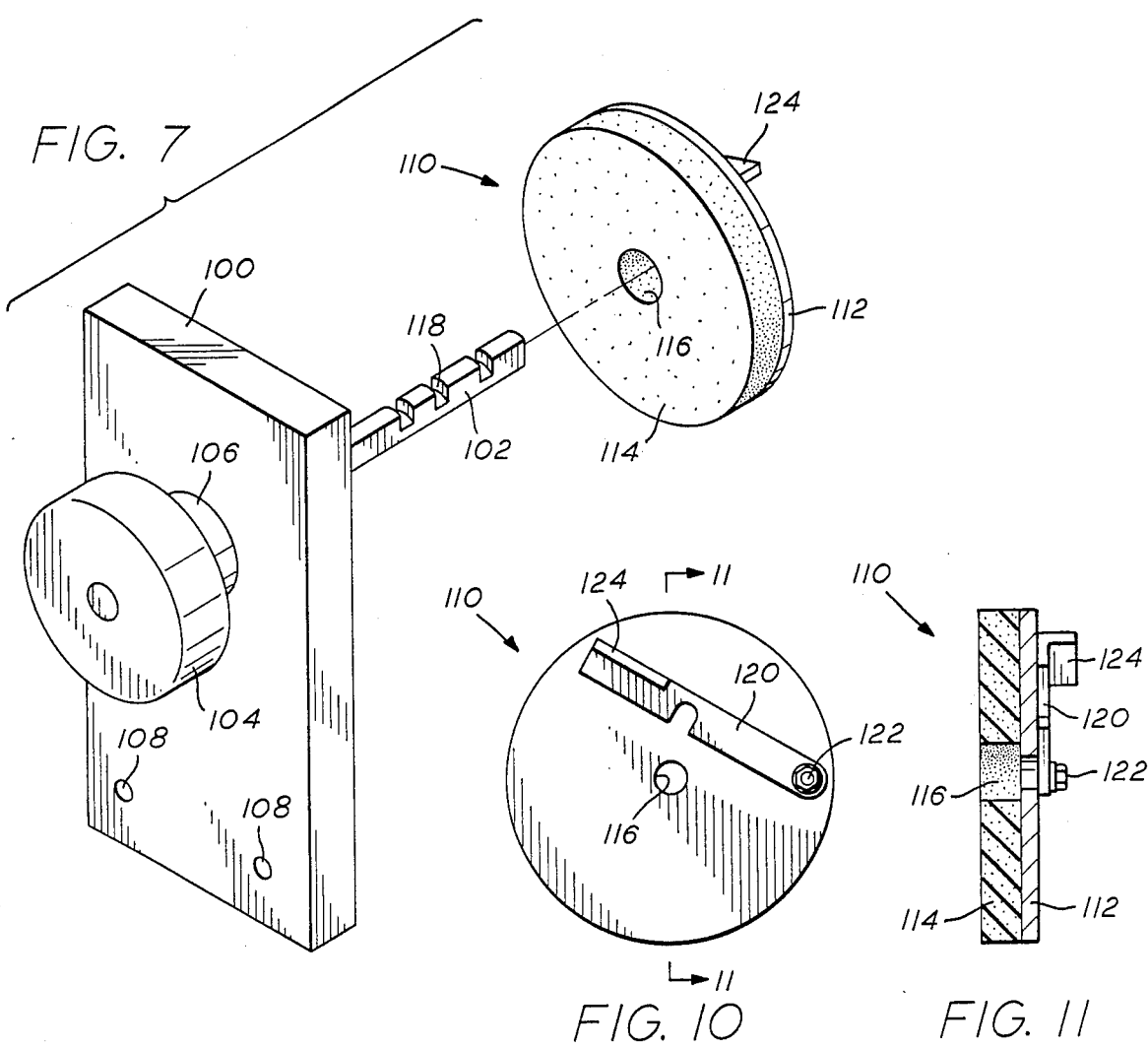
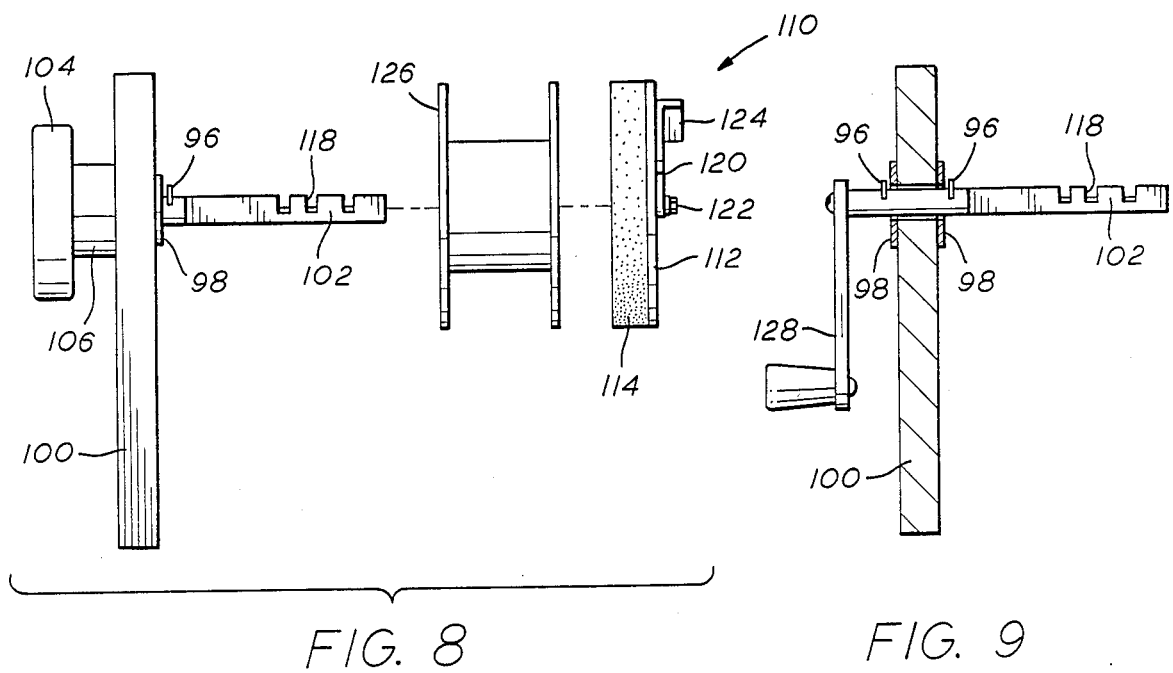

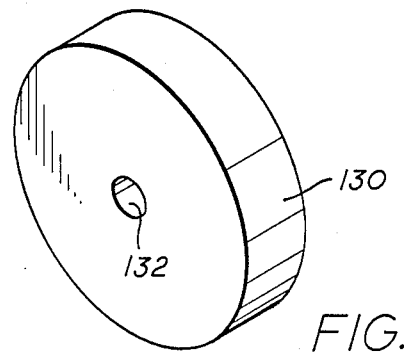
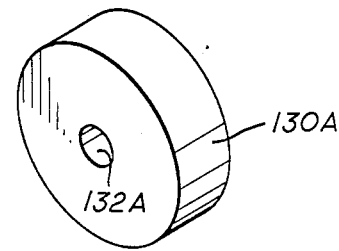
FIG. 12   FIG. 13
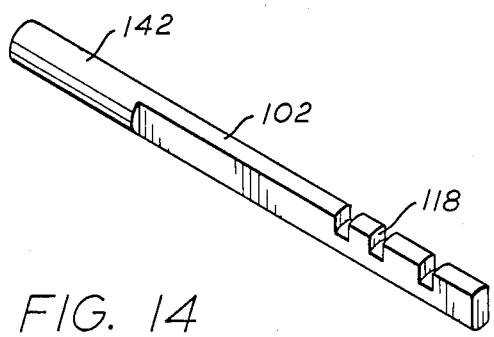
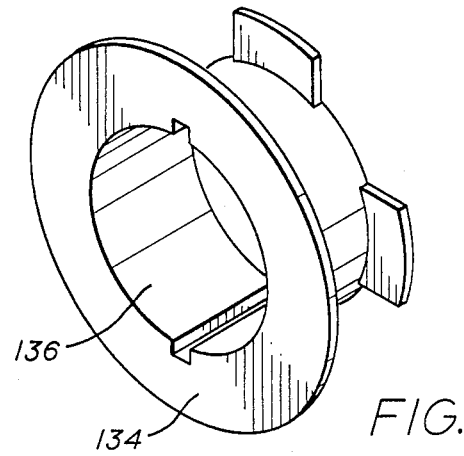
FIG. 14   FIG. 15
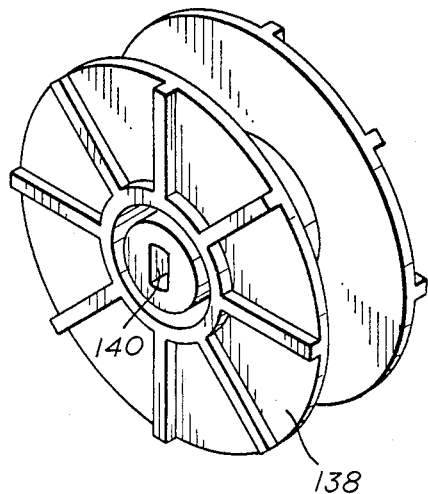
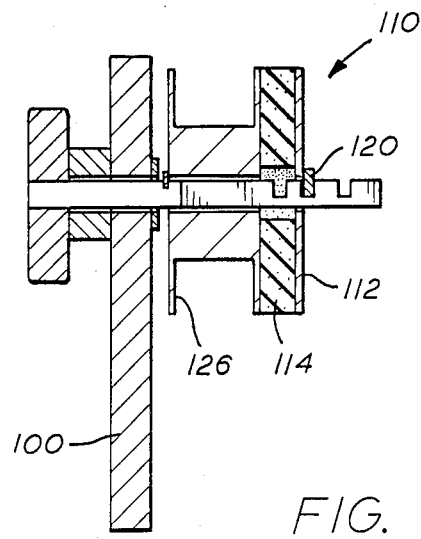
FIG. 16   FIG. 17

SPOOL REWINDER

BACKGROUND OF THE INVENTION

This application is a continuation in part of Ser. No. 901,379 filed 8/28/86.

1. Field of the Invention

The present invention relates to a device for reloading spools, particularly spools used for nylon line type cutting apparatus, such as lawn edgers and trimmers.

2. Related Art

The present device is particularly useful for reloading the spool used in nylon line type edgers and trimmers. Although loaded spools may be purchased, it is far less expensive to purchase "generic" nylon line in bulk and to reload a spool. Nylon line used for this purpose is relatively stiff and hard to handle, hence reloading the spool by hand requires a winder. Since this winder is intended for home use, its design and function must be simple for low cost, ease of use and safety. The present device achieves this result by biasing a member adapted to hold and position a spool toward a baffle or surface.

There are numerous devices and apparatus which serve as reels or take-up spools for flexible lines. Many of these devices employ biasing springs in various configurations. U.S. Pat. No. 2,414,169 to Raymond discloses device to wind rope, which has a spring biased crank and shaft on which a reel is mounted. U.S. Pat. No. 3,295,787 to Golonka discloses an auxiliary fish line spool holder which comprises a support base, a crank affixed to a spool and a compression spring biased against the spool/crank combination to snub (provide frictional resistance) the rotation of the spool/crank. U.S. Pat. No. 3,652,027 to Wong discloses a kite reel which comprises a spool with a crank affixed thereon with ratchet teeth on the spool adapted to engage ratchet teeth on spring biased locking member, to allow take up while preventing inadvertent unwinding of the string. U.S. Pat. No. 3,979,833 to Grundman discloses a tape reel with two tapes storable thereon comprising two reels, which are separately engageable with crank shaft by a pair of compression springs tightened against a clutch plate. U.S. Pat. No. 4,164,332 to Insch discloses a rewind spool for marker buoys which comprises a pair of rotary holding end cups, one of which is spring loaded to press the marker buoy against the other cup to which a crank handle mechanism is attached.

It is a feature of the present invention that it is comprised of few parts. It is an advantage of the present invention that its method of operation is very easily discerned with minimal instruction. These and other features and advantages will be apparent from the following descriptions.

SUMMARY OF THE INVENTION

Briefly, in one embodiment the present invention comprises a frame having two opposed and substantially parallel sides. Extending through a first of those two sides toward the second side is a shaft having a gripping member on the end of the shaft nearest the second side with the shaft being biased toward the second side, whereby a spool placed on the gripping blade is biased against the second side and thus held in place. The shaft has a crank on the end opposite to the gripping member, which is used to rotate the shaft and hence the spool for rewinding the spool with line. More preferably the second side of the frame against which the spool is biased is a baffle, which allows the spool to slide rotationally without a hub or any type of rotatable attachment on that side. The biasing means is conveniently a compression spring position around the shaft between the gripping plate and the first side holding the shaft. It is also preferred that the present device have a handle or other gripping means thereon so that it may be hand held or gripped by a vice or otherwise attached to a stable object such as a table or work bench.

In another even simpler embodiment the invention comprises a plate (surface or baffle) a shaft rotatably mounted through said plate, a means for hand rotation on one distal end of said shaft, a plurality of notches located along the portion of shaft distal to said hand rotation means and a member removably mounted on said shaft having means thereon to engage with a notch whereby said member rotates with said shaft and a resilient, compressible element attached to said member on a surface opposing said plate. The entire spool rewinder may be hand held, however in a preferred embodiment the plate is adapted to be affixed to a structure, such as a work bench.

In addition to these components of the spool rewinder there may be various adapters to allow spools with varying sizes and shapes of center holes to be mounted on the shaft.

The following description shows a preferred embodiment, however it is not intended to limit the invention. Where possible the same indicia have been used for the same part in different figures.

BRIEF DESCRIPTION OF THE INVENTION

FIG. 7 is an expanded isometric view of an alternative embodiment of the spool rewinder.

FIG. 8 is a side elevation of the device of FIG. 7 with a spool positioned relative to the other elements.

FIG. 9 is a cross sectional elevation of a modified form of the device of FIG. 7.

FIG. 10 is an in plan view of a removable member of the device.

FIG. 11 is a cross sectional side view of the member of FIG. 10 taken along line 11—11.

FIG. 12 is an isometric view of an adapter insert.

FIG. 13 is an isometric view of a smaller adapter insert.

FIG. 14 is an isometric view of the shaft of the device.

FIG. 15 is an isometric view of one type of spool.

FIG. 16 is an isometric view of another type of spool.

FIG. 17 is a partial cross sectional view of the device shown in FIG. 8 with the spool in place.

DETAILED DESCRIPTION OF THE INVENTION

Figure 1:
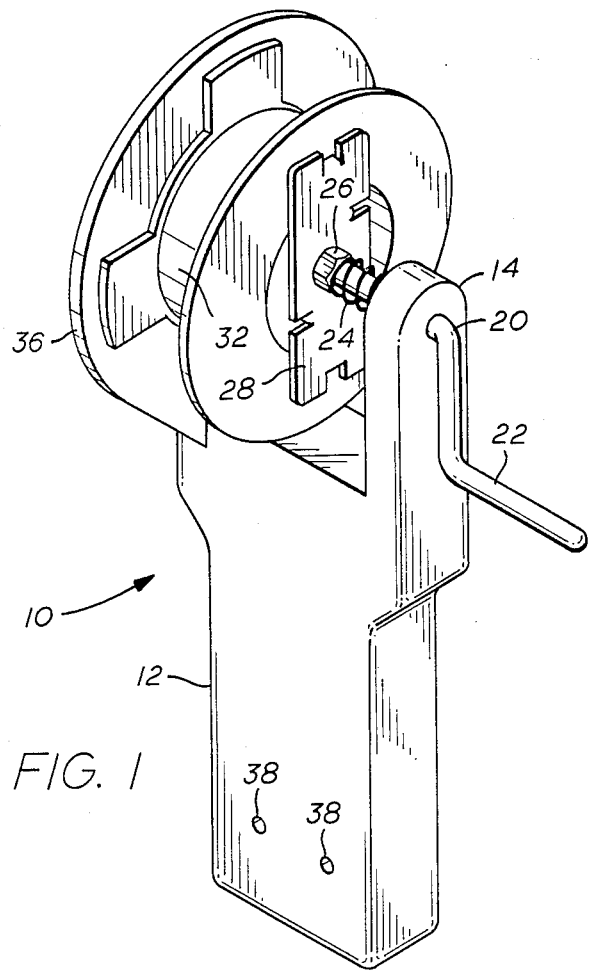
FIG. 1 is an isometric view of the present spool rewinder.
Figure 2:
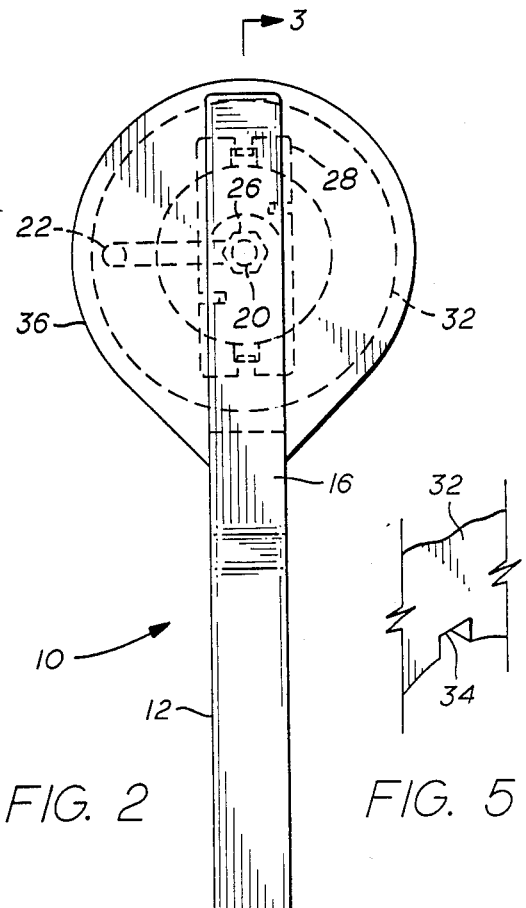
FIG. 2 is a side elevational in plane view of the present spool rewinder.

The spool rewinder 10 is shown isometrically in FIG. 1. Basically there is a frame comprised of the two opposed and substantially parallel side members 14 and 16. In the embodiment depicted here these are only three sides to the frame and the third side is an elongated handle 12.

A passage or bore 18 extends through side member 14. Extending through the bore 18 is shaft 20, which is rotatable in the bore. The shaft extends to become crank 22 on the end distal to the second side member 16. Near the end of shaft 20 proximal to second side member 16 a spool gripping means, plate 28, is mounted, for example, by nuts 26 on a threaded end portion such that the gripping means rotates, with rotation of the shaft (e.g., by the crank).

The plate 28 is adapted to engage with the spool 32 on which line is to be rewound, which in this instance is by prongs 30 extending outward toward the second side member 16, some of which will engage with corresponding slots 34 (FIG. 5) in the spool. Other gripping means adapted to particular and specific spools may be employed instead of the preferred plate and prongs disclosed here. By the same token, spools may be modified, for example by cutting a suitable notch therein, in order to fit the gripping means (plate and prongs) described here.

The shaft 20 and gripping means 28 are biased toward second side member 16 by compression spring 24 which bears against the first side member 14 and the nut 26 and/or blade 28.

The spool 32 is held by the gripping means 28 pressed against it by the spring and forced against the second side 16, which preferably has an enlarged surface to form a baffle 36. In this way the spool, preferably a configuration at least as large as the spool is gripped and held in place and free to rotate, when crank 22 is rotated, by sliding against the baffle. Thus there is only one engaging mechanism in the present device, whereas most spool or reel handling devices are mounted on a shaft and/or mounted to two sides. The simple yet fully functional arrangement of the present invention allows for fewer components in manufacture and fewer operating parts to fail.

Figure 5:
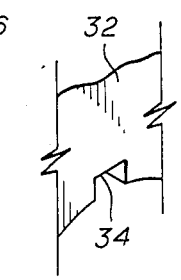
FIG. 5 is an isometric view of a portion of the spool.
Figure 6:
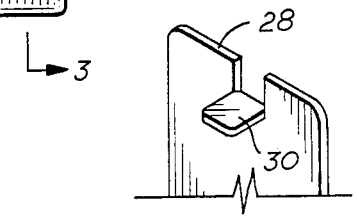
FIG. 6 is an isometric view of a portion of the plate used to grip the spool.
Figure 3:
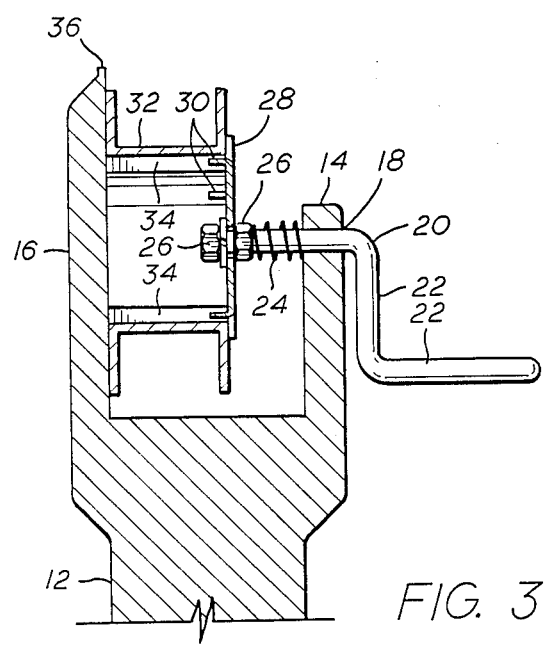
FIG. 3 is a partial cross sectional view along line 3—3 of FIG. 2.
Figure 4:
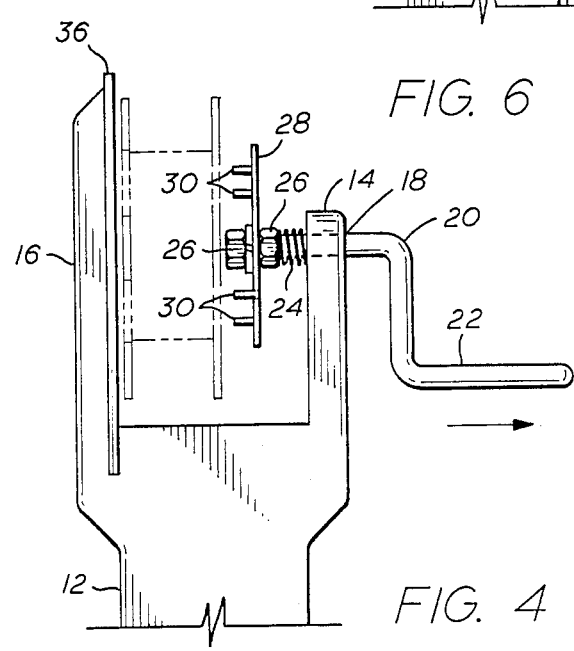
FIG. 4 is the view of FIG. 3 in elevation.

In the embodiment illustrated in the drawing the gripping means is a plate or blade 28 with two prongs 30 extending in the direction of the second side member and baffle 36. The detail of this configuration is shown in FIG. 6. FIG. 5 shows a cut out portion of a spool with a notch 34 corresponding to the prong 30. In this embodiment there will be an opposed slot 34 on the rim of spool 32 so that at least two opposed prongs 30 will engage in the corresponding notch 34 (FIG. 3).

In use the spool winder is preferably attached to a fixed object such as a table or work bench. For this purpose bores 38 are provided in handle 12 so that screws, bolts, nails or the like may be used to fasten the spool rewinder in place.

In FIG. 7 an alternative embodiment is shown which has few parts. There is a plate or base member 100 which may be hand held, but is preferably affixed to support such as a table or work bench by screws (not shown) through holes 108. Toward one end of the plate, spaced a sufficient distance to allow for a spool to be seated and rotate on shaft 102 when the plate is mounted on a bench, is a knob 104 which is mounted on one end of shaft 102 through plate 100 and spacer 106. As shown in FIG. 14 the portion 142 of the shaft passing through plate 100 is round and of a key like configuration on the end projecting from the plate and on which the spool is seated.

The portion of the shaft 102 distal to the knob 104 has a plurality of notches 118 therealong which are adapted to engage with slot 94 of arm 120. When engaged the member 110 will rotate with shaft 102. The member 110 mounts on shaft 102 through hole 116. The shaft is not round at this point but the hole 116, may be round because the engagement of the slot 94 with the notches 118 taking up the play when a spool is in place.

Member 110 consists of a hard disc 112 to which is affixed, for example by gluing, a resilient, compressible element, such as foam rubber or polyurethane foam. Attached to disc 112 is arm 120 on a pivot for example a bolt with a nut 122). An outward extending flange 124 is provided for grasping. The arm 120 is attached at a point which aligns slot 94 up with hole 116 so that the engagement previously described can occur.

In FIG. 8 the device is shown with a spool 126 aligned with shaft 102 for seating thereon. Spool 126 could have the configuration shown in FIG. 16 (spool 138 with the slot like opening 140 which corresponds to the shaft) or as shown in FIG. 15 (spool 134 with the large opening 136 with an adapter such as shown in FIGS. 12 or 13 in the opening 136, i.e., adapter 132 or 132A respectively with round opening 132 or 132A respectively). FIG. 17 shows the spool on the assembled rewind device. The plurality of notches 118 on the shaft 102 allows the member 110 to push against the spool, compress the resilient material 114 and thereby grasp the spool between the plate 100 and the member 110 which is engaged with the shaft. When the shaft rotates the spool is rotated because of the friction with the compressed member. The surface of plate 100 adjacent to the spool must be smooth and non sticking to cause this to happen easily.

FIG. 9 shows a modified device using a crank handle 128 in place of knob 104 and a washer 98 with lock washer 96 in groove (not shown) on the shaft in place of the spacer 106. The washer 98, lock washer 96 arrangement is also used to hold the shaft in place on the spool side.

The invention claimed is:

1. A spool rewinder comprising:
 (a) a plate;
 (b) a shaft rotatably mounted through said plate;
 (c) a means for hand rotation of said shaft mounted to one end thereof;
 (d) a plurality of notches located along the portion of said shaft distal to said means for hand rotation and separated therefrom by said plate; and
 (e) a member removably mounted on said shaft comprising a disc, a means on said disc to engage with a notch on said shaft whereby said member rotates with said shaft and a resilient compressible member attached to said disc on a surface thereof opposed to said plate.

2. The spool rewinder according to claim 1 wherein said means for hand rotation comprises a knob.

3. The spool rewinder according to claim 2 wherein said notches are aligned along an axis of said shaft.

4. The spool rewinder according to claim 3 wherein said shaft has a generally round configuration in the portion contacting said plate.

5. The spool rewinder according to claim 4 wherein said resilient compressible material is foamed polymer.

6. The spool rewinder according to claim 4 wherein said plate surface is smooth and non sticking.

7. The spool rewinder according to claim 3 wherein said resilient compressible material is foamed polymer.

8. The spool rewinder according to claim 2 wherein said resilient compressible material is foamed polymer.

9. The spool rewinder according to claim 1 wherein said means for hand rotation comprises a crank.

10. The spool rewinder according to claim 1 wherein said notches are aligned along an axis of said shaft.

11. The spool rewinder according to claim 10 wherein said means for hand rotation is a crank.

12. The spool rewinder according to claim 11 wherein said resilient, compressible material is foamed polymer.

13. The spool rewinder according to claim 12 wherein said plate surface is smooth and non sticking.

14. The spool rewinder accoridng to claim 10 wherein said resilient compressible material is foamed polymer.

15. The spool rewinder according to claim 1 wherein said shaft has a generally round configuration in the portion contacting said plate.

16. The spool rewinder according to claim 1 wherein said resilient, compressible material is foamed polymer.

17. The spool rewinder according to claim 1 comprising means for affixing to a structure.

18. The spool rewinder according to claim 1 wherein said plate surface is smooth and non sticking.

19. The method of rewinding an empty spool comprising (a) positioning an empty spool on a shaft rotatably mounted through a plate, said shaft having means for hand rotation and notches along a portion thereof, (b) seating a member on said shaft adjacent to said spool, (c) compressing a resilient element of said member against said spool and engaging a means on said member with a notch on said shaft, and (d) rotating said shaft, whereby the spool is held against said plate and rotates with said shaft.

* * * * *